United States Patent [19]

Newman

[11] Patent Number: 5,581,260
[45] Date of Patent: Dec. 3, 1996

[54] ANGULAR DIVERSITY/SPACED DIVERSITY CELLULAR ANTENNAS AND METHODS

[75] Inventor: Edward M. Newman, Nesconset, N.Y.

[73] Assignee: Hazeltine Corporation, Greenlawn, N.Y.

[21] Appl. No.: 379,819

[22] Filed: Jan. 27, 1995

[51] Int. Cl.[6] .................................................. H01Q 3/02
[52] U.S. Cl. ........................ 342/374; 342/372; 455/277.2
[58] Field of Search ................................ 342/374, 372; 455/277.2

[56] References Cited

U.S. PATENT DOCUMENTS

| | | | |
|---|---|---|---|
| 3,715,749 | 2/1973 | Archer | 343/5 R |
| 3,987,444 | 10/1976 | Masak et al. | 343/100 LE |
| 4,704,734 | 11/1987 | Menich et al. | 455/33 |
| 4,845,507 | 7/1989 | Archer et al. | 343/754 |
| 5,303,396 | 4/1994 | Ooyagi et al. | 455/134 |
| 5,313,660 | 5/1994 | Lindenmeier et al. | 455/135 |

Primary Examiner—Thomas H. Tarcza
Assistant Examiner—Dao L. Phan
Attorney, Agent, or Firm—Edward A. Onders; Kenneth P. Robinson

[57] ABSTRACT

In a communication system, two multi-beam antennas laterally spaced from each other each provide coverage of an azimuth sector for receiving signals from a system user. Each antenna provides lower gain performance at regions of crossover between its beams, as compared to peak gain along the center line of each beam. By aligning the two multi-beam antennas at different azimuths within the sector of interest, angular diversity is achieved. With the peak gain beam center lines of one multi-beam antenna aligned with regions of beam crossover of a similar antenna, a minimum gain improvement of 5 dB may typically be obtained with two four-beam antennas, as compared to coverage of the same sector by one or more antennas each having a single sector-wide beam. Systems and methods for achieving angular diversity/spaced diversity operation are described.

11 Claims, 4 Drawing Sheets

ANGULAR DIVERSITY/SPACED DIVERSITY CELLULAR ANTENNAS AND METHODS

This invention relates to antenna systems for receiving communication signals from mobile users and, more particularly, to multi-beam antenna methods and systems employing both angular diversity and spaced diversity to provide higher gain reception of signals transmitted by mobile user equipment.

BACKGROUND OF THE INVENTION

Radio communication with mobile users in moving vehicles, for example, is typically provided via fixed base stations or cell sites. Each cell site includes one or more antennas arranged for transmission of signals to and reception of relatively low power signals from mobile user equipment presently within a limited geographical area around the cell site. To provide the desired antenna coverage, the area around the cell site may be divided into sectors. Four sectors each of 90 degrees in azimuth coverage, or three 120 degree sectors, thus provide 360 degrees azimuth coverage around a cell site. The cell terminology reflects the necessity of providing a pattern of adjacent cells, each with its own cell site antenna installation, in order to provide mobile communications coverage over a geographic area or region larger than the limited area covered by a single such installation.

Considering one of the 120 degree sectors referred to, it is relatively straightforward to design an antenna system providing 120 degree sector coverage. The antenna system will be effective to transmit signals to any user within the desired sector coverage area. If signals are too weak to reliably reach users at the outermost edge of the sector coverage area, transmitter power can be specified at a higher level. However, for signals to be received from a user at the sector edge, user transmissions are normally subject to limitations in power transmitted from the mobile equipment. If the user's transmitted power is inadequate to achieve reliable reception from the outer portions of the sector coverage area, the overall size of the cell and the gain of the receive antenna at the fixed cell site become limiting considerations. A number of interrelated factors, including expected user population and available broadcast frequency spectrum, may also be involved in determining the optimum size of the coverage area of each cell site. It will be apparent, however, that with smaller coverage areas additional cell site installations will be necessary to provide continuous coverage over a geographical region. Additional cell site installations require the purchase, installation and maintenance of more equipment as well as increased requirements and costs of site acquisition, interconnection facilities and system support.

Use of higher gain receive antennas at each cell site would permit reliable reception of user signals at greater distances. However, for a given type of antenna, gain is directly related to beamwidth and an antenna providing coverage over a 120 degree azimuth sector typically provides relatively low gain performance. High gain may be achievable by use of larger antennas, however size and cost may become limiting factors. Higher gain is also possible by use of narrow beamwidth antennas providing coverage of only a portion of a sector. Use of antenna systems providing sector coverage by provision of a plurality of narrow beams could be arranged to provide higher gain than available by use of a single wide beam sector antenna. However, for a multi-beam antenna the antenna pattern gain provided at beam crossovers between adjacent narrow beams will be significantly lower than the peak gain provided along the beam centerline of each narrow beam. For full sector coverage, the improvement in gain achieved by replacement of a single wide beam sector antennas with antennas providing two or more narrower beams is, therefore, limited by the effective gain provided at the crossover between adjacent beams.

Objects of the present invention, therefore, are to provide new and improved multi-beam receive antenna systems and such systems which provide one or more cost or operational advantages over prior mobile communication or other types of antenna systems.

SUMMARY OF THE INVENTION

In accordance with the invention, an angular diversity/spaced diversity method, for providing both higher antenna gain in an azimuth sector and spaced diversity reception in a communication system including a receiver system for receiving user signals from a user located in such sector, comprises the steps of:

(a) providing a first antenna assembly having a multi-beam antenna pattern providing coverage in the sector and including a plurality of beams each having a peak gain value along its respective beam center line and a crossover gain value in a region of beam crossover between adjacent beams of the first antenna assembly;

(b) aligning the antenna pattern of the first antenna assembly at a first azimuth within the sector;

(c) providing a second antenna assembly, laterally spaced from the first antenna assembly by a plurality of wavelengths at an operating frequency, having a multi-beam antenna pattern providing coverage in the sector and including a plurality of beams each having a peak gain value along its respective beam center line and a crossover gain value in a region of beam crossover between adjacent beams of the second antenna assembly;

(d) aligning the antenna pattern of the second antenna assembly at a different azimuth within the sector relative to the first azimuth of the first antenna assembly to position at least one of the beam center lines of the second antenna assembly in alignment with a region of beam crossover of the first antenna assembly so that each beam of the second antenna assembly provides coverage partially overlapping coverage provided by at least one beam of the first antenna assembly;

(e) providing first signals received from the user in one of the beams of the first antenna assembly;

(f) providing second signals received from the user in a beam of the second antenna assembly partially overlapping the aforesaid one of the beams of the first antenna assembly; and (g) processing in the receiver system one of the following: the first signals, the second signals, and a combination of the first and second signals; in order to provide spaced diversity reception of signals and a gain value higher than the crossover gain values regardless of the azimuth at which signals are received from the user.

Also in accordance with the invention, an angular diversity/spaced diversity antenna system, suitable for use in a communication system including a receiver system for receiving user signals from a user located in an azimuth sector, includes the following antenna assemblies. A first antenna assembly has a multi-beam antenna pattern providing coverage in the sector via a plurality of beams each having a peak gain value along its respective beam center line and a crossover gain value in a region of beam crossover between adjacent beams of the first antenna assembly. A second antenna assembly, similar to the first antenna assembly, is laterally spaced from the first antenna assembly by a plurality of wavelengths at an operating frequency and provides coverage in the sector via a plurality of beams each having a peak gain value and a crossover gain value as described with reference to the first antenna assembly. The second antenna assembly is aligned at a different azimuth within the sector, relative to the first antenna assembly, in order to position at least one of the beam center lines of the second antenna assembly in alignment with a region of beam crossover of the first antenna assembly. As a result, each beam of the second antenna assembly partially overlaps at least one beam of the first antenna assembly. The antenna system also includes a first output port, coupled to the first antenna assembly, providing first signals received from the user in one of the beams of the first antenna assembly and a second output port, coupled to the second antenna assembly, providing second signals received from the user in a beam of the second antenna assembly partially overlapping one of the beams of the first antenna assembly. The antenna system is arranged to enable a receiver system having access to signals provided at the first and second output ports to process one of the following: the first signals, the second signals, or a combination of the first and second signals; so as to provide spaced diversity reception of signals and a gain value higher than the crossover gain value regardless of the azimuth at which signals are received from the user.

In a particular embodiment of the antenna system, each of the first and second antenna assemblies is configured to provide four beams, each of nominally 30 degree beamwidth, with an azimuth differential between adjacent beams of nominally 30 degrees, to provide coverage in a 120 degree azimuth sector. In this arrangement the different azimuth of alignment of the second antenna assembly relative to the first antenna assembly is nominally 15 degrees.

For a better understanding of the invention, together with other and further objects, reference is made to the accompanying drawings and the scope of the invention will be pointed out in the accompanying claims.

DESCRIPTION OF THE INVENTION

Figure 1:
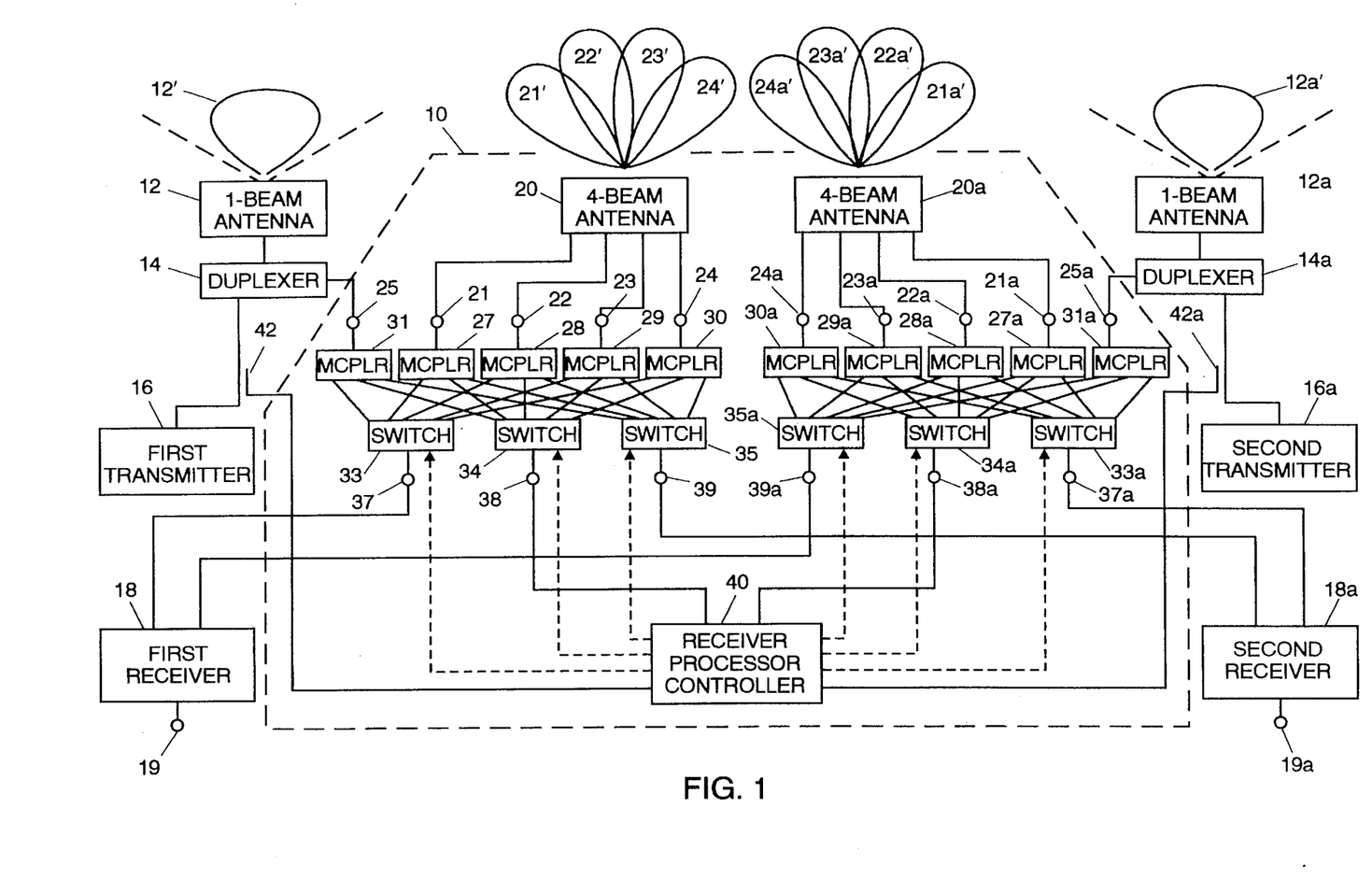
FIG. 1 illustrates a cellular type communication system incorporating an angular diversity/spaced diversity antenna system in accordance with the invention.

Referring now to FIG. 1, there is illustrated a form of communication system for receiving signals from a mobile user and a form of angular diversity/spaced diversity antenna system 10 suitable for use in such communication system to provide higher gain reception of user signals.

The communication system includes a sector antenna 12, a duplexer 14, a transmitter 16 and a receiver system 18. The communication system also includes a similar sector antenna 12a which is desirably laterally spaced from sector antenna 12 by several wavelengths at a frequency in the operating band in order to provide spaced diversity signal reception via two different signal paths. In this example, each of sector antennas 12 and 12a have a beamwidth effective to provide coverage of a 120 degree azimuth sector, so that fully overlapping coverage of the sector results. This system also includes a duplexer 14a, a second transmitter 16a and a second receiver system 18a. Transmitter 16a and receiver system 18a may be arranged to operate at frequencies different from the signal frequencies utilized by transmitter 16 and receiver system 18, in order to provide additional operational capacity. Following reception, user signals are provided at receiver outputs 19 and 19a for further processing or transmission to parties intended by the users. In the absence of antenna system 10 each of antennas 12 and 12a would be connected to receiver system 18 to enable receiver system 18 to utilize first user signals received via sector antenna 12 or sector antenna 12a, or such signals from both antennas in combination. Similarly, in the absence of antenna system 10, receiver system 18a would be arranged to utilize signals from either or both of antennas 12 and 12a for reception of signals from a second user transmitted at a different frequency. In other applications, the basic communication system may include only a single transmitter/receiver/antenna combination or may have a variety of other configurations.

The angular diversity/spaced diversity antenna system 10, as shown in FIG. 1, includes multi-beam first antenna assembly means, shown as antenna assembly 20, which may comprise four side-by-side vertical arrays of dipoles or other radiating element arrangements suitable for providing four first antenna beams 21'–24' each having a beam width narrower than the 120 degree sector and aligned so that the four beams collectively cover at least a portion of the sector. Typically, if a four beam antenna configuration is used the first antenna beams will be arranged to collectively cover the full 120 degree azimuth sector. The desired beams may be provided using arrays of radiating elements, with or without the inclusion of a suitable beam forming network, or in other suitable manner by persons skilled in the field. As shown, beam ports 21–24 are provided for each coupling first antenna beam signals received in one of the four first antenna beams provided by antenna assembly 20. Beam port 25 similarly provides coupling of sector beam signals received in the beam of sector antenna 12.

The FIG. 1 antenna system 10 also includes multicoupler means 27–30 respectively coupled to each of the beam ports 21–24. As shown, the multicoupler means 27–30 make each of the first antenna beam signals provided at the beam ports 21–24 available at a plurality of three parallel ports represented by the three output leads shown emanating from the bottom of each of units 27–30 in FIG. 1. In addition, as shown at 31 the multicoupler means similarly makes sector beam signals coupled via duplexer 14, available at three parallel ports. Multicoupler units 27–31 may take the form of receiver amplifiers and associated signal splitting circuitry responsive to received signals for providing low-noise amplification and multiport access to each respective signal, while maintaining or translating the carrier frequency of the received signals, as desired in particular applications. In other embodiments more or fewer than three parallel ports may be employed. Low noise amplifiers may be included at each of the multicoupler units 27–31, at each of the beam outputs of antenna 20 prior to the beam ports 21–24, or at both such locations, as appropriate. Other types of multi-output junction devices or matrix coupling arrangements may be utilized by skilled persons to provide the desired multicoupler capability.

As illustrated, the antenna system 10 further includes a plurality of switching means, shown as single-pole five position switching devices 33–35. Each of switching devices 33–35 is thus coupled to each of the beam ports 21–25, via the parallel output ports of multicoupler units 27–31. The switching means have a plurality of switch output ports 37–39 respectively coupled to switching devices 33–35 and each switching device is responsive to selection signals provided via the dashed lines respectively connected to each of the switching devices 33–35. With this arrangement, any one of the first antenna beam signals from antenna system 10 can be selectively provided on an independently selected basis at first switch output port 37, at second switch output port 38 and at third switch output port 39. As shown, the first and third switch output ports are respectively connected to the first and second receiver systems 18 and 18a. The switching devices 33–35 comprising the switching means may be any suitable form of electrical, electronic, mechanical, optical or other form of device appropriate for enabling selective coupling of one of a plurality of inputs to an output.

Controller 40 is also included in the FIG. 1 antenna system 10, as shown. Controller 40 is coupled to the second switch output port 38 and also to each of switching devices 33–35 by dashed lines representing the paths of selection signals for individual selection of the one of the first antenna beam signals which is to be provided at switch output ports at any particular point in time. Controller means 40 is configured, as will be further described, for carrying out a plurality of functions, including the following. First, for providing selection signals to the switching device 34 of the switching means to cause first antenna beam signals received in different ones of the beams of first antenna 20 to be sequentially provided at the second switch output port 38 and thereby input to controller 40. Such sequential selection is desirably carried out on a continuous basis while the antenna system 10 is in operation. Second, for analyzing the sequentially provided beam signals and selecting, on a predetermined basis, beam signals received in one of the first antenna beams (e.g., beam 21' of antenna assembly 20). Such selection basis may comprise selection of the beam signal having highest user signal amplitude, or the best signal to spurious signal ration, relative to the other three first antenna beam signals, for the particular user signal of interest at that time. Third, for providing selection signals to switching device 33 of the switching means to cause the selected beam signals (e.g., signals from beam 21') from the first antenna 20 to be coupled to receiver system 18 via the first switch output port 37. As a result, the user signal is provided to receiver system 18 based upon reception by a narrow beam/high gain antenna which in this case would provide antenna gain on reception about 6 dB higher than provided by sector antenna 12.

In operation, controller 40 can be arranged to continue such signal analysis and selection. As a result, if the user changes position or environmental signal transmission conditions change, so that better coverage of the new position of the user is provided by one of the other beams of antenna assembly 20 (e.g., beam 22') signals from that beam will be coupled to receiver system 18. Controller 40 can also be configured to handle a plurality of incoming signals from different users in the same time period by repetitively processing each such signal during very short time intervals within the time period or by application of other techniques available for use in multiple signal reception in the context of different applications of the invention. Configuration of controller 40 will be discussed further below. As shown in FIG. 1, controller 40 is also enabled to control the coupling of signals received in the sector beam 12' of sector antenna 12 via selection signals supplied to switching device 33. In a typical operating arrangement, user signals from sector antenna 12 are provided to first receiver 18: (a) initially for user verification; (b) when such signals have a higher amplitude than signals from any of beams 21'–24'; (c) when the antenna system 10 is inoperative or being serviced; (d) when the signal level is high because the user is very close to the fixed cell site; or (e) under other defined operating conditions. With such a fail/safe fall back configuration, the communication system has a continuing capability of providing a basic level of performance which is equivalent to performance without the presence of antenna system 10.

A number of further aspects of the FIG. 1 configuration should be addressed. With the exception of controller 40, the antenna system 10 as shown includes two mirror-image right and left portions. All elements on the right side of FIG. 1 bear corresponding reference characters including an "a" suffix. If the two four beam antenna assemblies 20 and 20a are laterally spaced and each provides full coverage of the sector, spaced diversity reception will be available for each user position in the sector. The signal analysis, signal selection and selection signals provided by controller 40 will thus cause to be made available to receiver 18 for a specific user, user signals from one of the beams of antenna assembly 20 coupled via switch output port 37 to the left input to receiver system 18 and user signals from one of the beams of antenna assembly 20a coupled via switch output port 39a to the right input to receiver system 18. Receiver system 18 may then select its right or left input as providing the best quality user signal reception or may combine signals from both inputs by additive combination or in any appropriate manner. As previously noted, transmitter 16a and receiver system 18a may be arranged to operate at signal frequencies different from those used by transmitter 16 and receiver 18. This enables controller 40, in operation parallel to that already described, to select the best beam signals received by antenna assemblies 20 and 20a from a second user, transmitting at a frequency different from the first user, and cause those second user signals to be coupled to the left and right inputs of receiver 18a, independently of the first user signals coupled to receiver 18. As a separate matter, there are also included in FIG. 1 sampling couplers, shown as directional couplers 42 and 42a, arranged to provide to controller 40 very low power samples of signals transmitted by transmitters 16 and 16a respectively. Such samples (which may be at levels 30 dB below transmitted power, for example) enable controller 40 to derive synchronizing signals for reference purposes relative to the time of reception of user signals.

Figure 2:
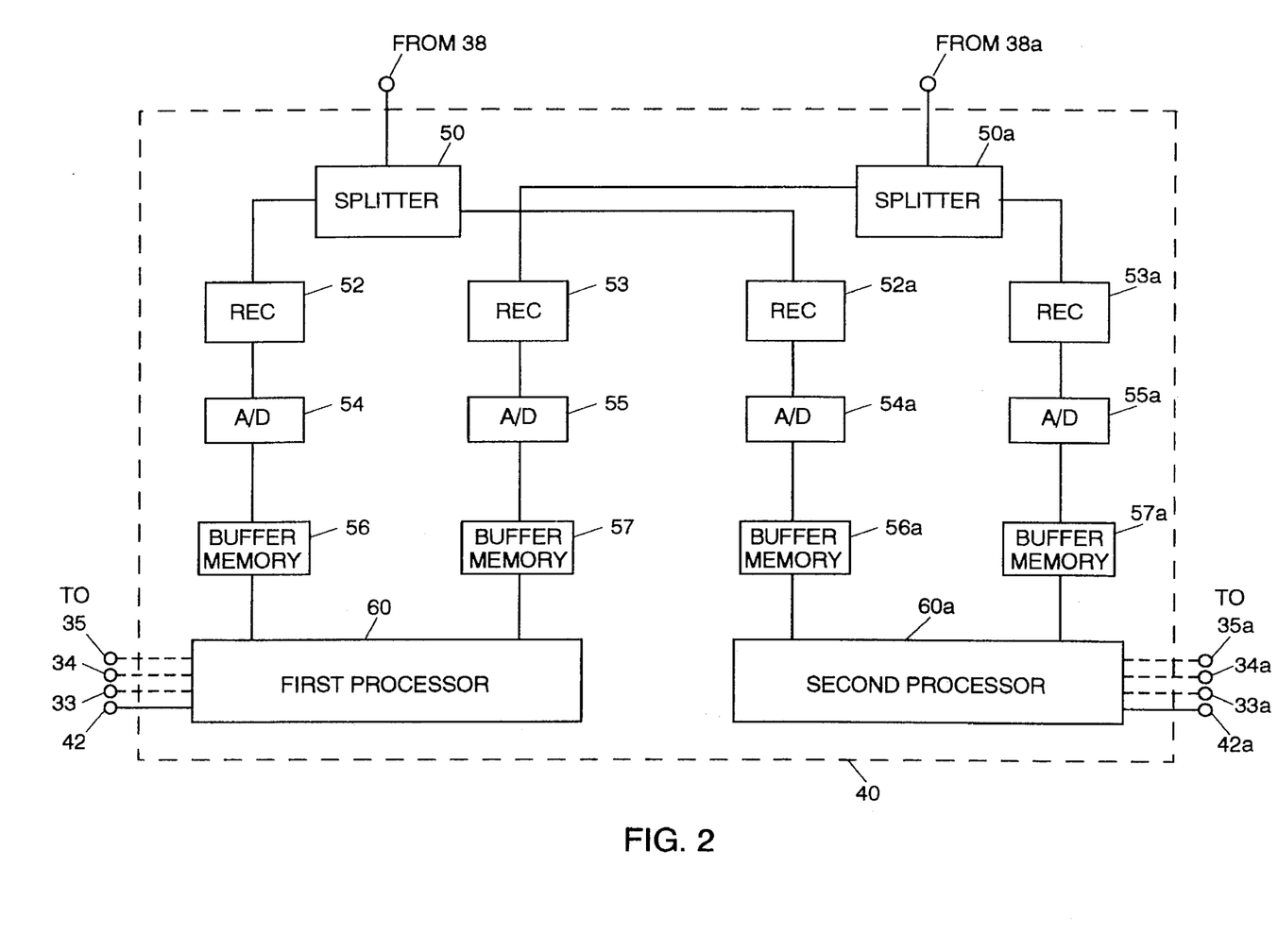
FIG. 2 shows in greater detail a form of controller unit suitable for use in the FIG. 1 system.

With reference now to FIG. 2, there is illustrated one form of controller 40 suitable for use in the antenna system 10 of FIG. 1. As shown, signal splitters 50 and 50a receive radio frequency beam signals from respective switch output ports 38 and 38a included in FIG. 1. Splitter 50 provides portions of the beam signal from port 38 to the inputs of receivers 52 and 52a. Receiver 52 selects and demodulates to video frequency format the first user/first frequency signal from the selected beam signal of antenna assembly 20 (or antenna 12, depending on which signal is provided at port 38 at a particular point in time). The resulting video signal is processed by analog to digital converter 54 and stored in digital form in buffer memory 56. Similarly, splitter 50a provides portions of the beam signal from port 38a to the inputs of receivers 53 and 53a. Receiver 53 selects and demodulates the first user/first frequency signal from antenna assembly 20a, which is then converted to digital form and stored in buffer memory 57. In the same manner, second user/second frequency signals from antenna assemblies 20 and 20a are respectively selected by receivers 52a and 53a, processed and stored in buffer memories 56a and 57a.

First and second processors 60 and 60a provide microprocessor based central processing functions for processing the stored digital signals for signal analysis and selection. In one mode of operation, within each time slot of about 15 milliseconds duration, 120 samples of incoming signals are stored in buffer memory 56 for processing in the following time slot. As a result of the continuous sequential switching of switching device 34, under the control of selection signals from controller 40, these 120 samples will successively include samples of signals received in each of beams 12' and 21'–24'. Of these 120 samples, 24 samples of the signals from sector antenna 12 are used to identify and validate an incoming transmission from a first user. As represented in the FIG. 3 angle/time diagram, successive groups of 24 samples of signals from first antenna beams 21', 22', 23' and 24' are then used for analysis and selection of the beam signal providing the highest quality signal from the first user (e.g., best signal to spurious signal ratio). The selected beam signal (e.g., beam 21') is then caused to be coupled to receiver system 18 via port 37 as a result of selection signals provided to switching device 33 from controller 40. Depending upon the system timing configuration, the process of storing 120 samples in a first time slot, with analysis of those samples of the first user signals received by antenna 20 in the following time slot, will be repeated about six times every 90 milliseconds. Between such repetition of storage and analysis of the first user signals, in this mode of operation signals received from five other users can be stored and analyzed in five intermediate time slots each of 15 millisecond duration. The cycle of sampling at a rate of one sample per each 125 microseconds to provide 120 samples for a first user signal in a first time slot, and doing the same for five additional users in the next five time slots, represents a processing frame which is repeated cyclically. Concurrently, the stored samples stored in one time slot are analyzed in the following time slot. Thus, the first user samples are stored in the first time slot and analyzed in the second time slot, the second user samples are stored in the second time slot and analyzed in the third time slot, etc. Then, in the next frame of operation new samples for the first user are stored in the seventh time slot, etc., the seventh time slot thus representing the start of the second frame of six time slots. If the analysis of second frame new samples for the first user indicate that the first user signals have become stronger in a different beam, action is taken to cause that different beam to be coupled to the receiver system. As part of the processing and analysis procedure, signal samples stored in the first time slot of successive frames for the first user can be subjected to averaging to smooth the effects of multipath reception. The preceding operations are carried out in first processor 60 in cooperation with receiver 52, converter 54 and buffer memory 56. A variety of different signal sampling and processing approaches can be employed. For example, a smaller number of signal samples can be selected in time slots of shorter duration. Also, processing of samples can be initiated in parallel as later samples are received in the same time slot, rather than providing for processing in the next time slot as discussed above.

Figure 3:
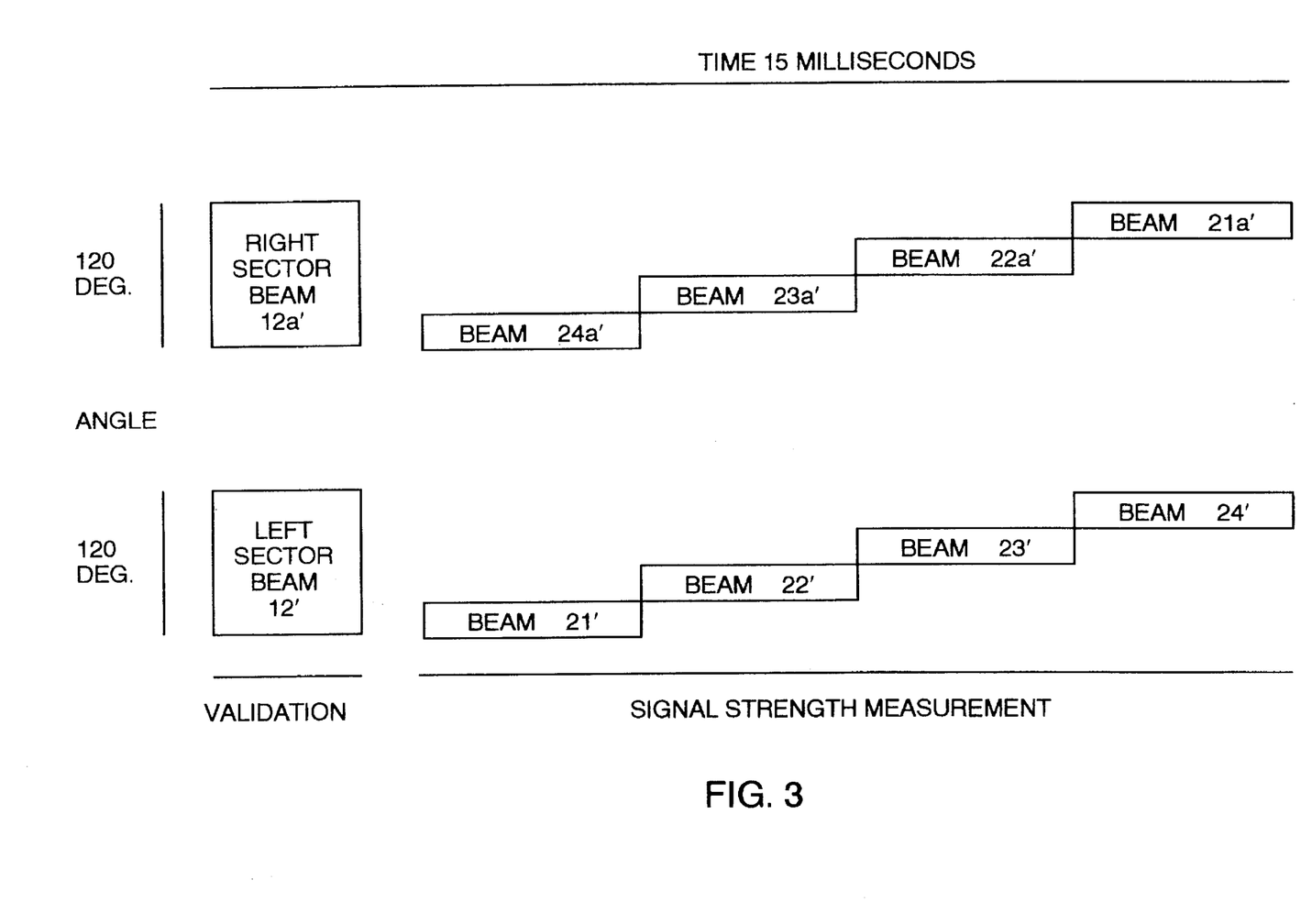
FIG. 3 provides an angle/time diagram useful in describing operation of the FIG. 1 system.

With reference to the upper portion of FIG. 3 it will be appreciated that the same processing is concurrently carried out in first processor 60 in cooperation with units 53, 55 and 57 with respect to first user signals received in sector beam 12a' and beams 24a', 23a', 22a' and 21a'. In the same manner, the preceding type operations are carried out concurrently, for user signals transmitted at the second frequency, in the corresponding units on the right side of FIG. 2 which are identified by the "a" suffix reference characters. As a result, the second processor 60a is effective to cause selected second user/second frequency signals received by antenna assemblies 20 and 20a coupled to the second receiver system 18a to be processed and provided at terminal 19a for further use or processing. Once having an understanding of the present invention and a desired mode of operation, each element of the FIG. 2 controller can be implemented in one or more alternative forms by persons skilled in the field. As described, the antenna system 10 is applicable in various embodiments to many types of communication systems which include sector antennas. Examples are cellular telephone systems and specialized mobile radio (SMR) dispatch and interconnect services used by truck and taxi companies. In other applications, antenna systems in accordance with the invention, utilizing one or more multi-beam antennas, may be used in transmit and receive modes without the presence of wide beam sector antennas. Also, various digital and other transmission techniques, including pulse-code modulation, and multiple access techniques, such as frequency division, time division or code division multiple access, can be employed in systems utilizing the invention. Persons skilled in the design and implementation of such systems are highly sophisticated in the complex signal and processing techniques and configurations utilized in such systems, so that no detailed consideration thereof is necessary.

There have thus been described receive antenna systems capable of enabling the presence of a user to be identified, the current right of such user to use the communication system verified, and a suitable high gain receive antenna beam coupled to a receiver for reception of stronger signals from the user. Alternatively, an acceptable signal level may be maintained while reliably receiving user signals over greater distances, thereby permitting use of larger cells and fewer antenna system installations. More specifically, with a 6 dB receive gain improvement through use of narrower beamwidth antennas it may be possible to reduce the number of antenna sites by one-half. The resulting savings are made possible by the present antenna systems which function to first detect the presence of a subscriber or user unit in a time slot. The system determines the beam currently providing the best receive signal from the user and activates the appropriate switching device to cause that beam to be coupled to the receiver. The system then continuously tracks the beam with best receive signal and controls the switching means so that the best signal for the user continues to be coupled to the receiver. This performance is provided in a system configuration which can be economically implemented and provides a fail/safe operating feature. In particular embodiments, the system can be arranged to operate in three basic modes. First, the system is initialized by use of signal samples derived from transmitted signals for purposes of system synchronization. The system is then operated in a normal operating mode as discussed in detail above. A third mode, not previously described, can address system maintenance by including automatic self test and a manual mode for diagnostic purposes, which may be implemented by skilled persons applying techniques applicable for such purposes.

Figure 4:
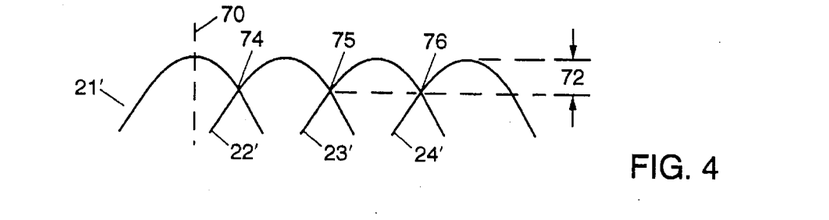
FIG. 4 is a four beam antenna pattern representation useful in describing the invention.

Referring now to FIG. 4, there is illustrated a simplified radiation pattern provided by a multi-beam antenna system such as antenna assembly 20 of the FIG. 1. As shown in FIG. 4, each of the beams 21'–24' exhibits peak antenna pattern gain along the beam center line (i.e., along center line 70 of beam 21') however with respect to the full 120 degree sector previously discussed, full sector coverage is subject to lower gain performance at beam crossovers. This gain differential is indicated at 72, representing the difference in gain at the beam center lines and the gain at the beam crossovers at 74, 75 and 76. In FIG. 4 beams 21'–24' are assumed to have identical beam profiles, when the beams are viewed in accordance with established antenna radiation pattern representation of radiated power versus angle at a reference power level.

FIG. 4 illustrates the example in which the baseline is a single sector antenna 12 of FIG. 1 which provides coverage of a 120 degree azimuth sector with a reference antenna gain. The gain profile of antenna 12 can be assumed to be 4 dB down at the left and right sector boundaries, relative to peak gain along the beam center line. Antenna 12 may typically provide a peak gain of 11 dBd, however, it will be appreciated that the actual performance of a specific sector antenna will be determined by the actual size, type and design objectives of the antenna provided for a particular application. The FIG. 4 radiation pattern represents the results of covering a 120 degree sector by use of an antenna assembly providing four narrower beams 21'–24' with the result that the effective utilized beamwidth is reduced from 120 degrees for antenna 12 to 30 degrees for each of the four beams 21'–24'. With this arrangement, the four beam composite antenna pattern provides higher gain (relative to a 120 degree beamwidth) to the extent of a 6 dB gain increase at the beam peaks (e.g., along center line 70) but only a 2 dB gain increase at the beam crossovers 74–76. For example, for a particular multi-beam network the beam crossovers occur at −4 dB below beam peak, so that the gain differential as represented at 72 in FIG. 4 is 4 dB. This results in the variation of the gain improvement, as compared to a wide beam sector antenna, of between 6 dB at narrow beam peaks and 2 dB at narrow beam crossovers.

Figure 5:
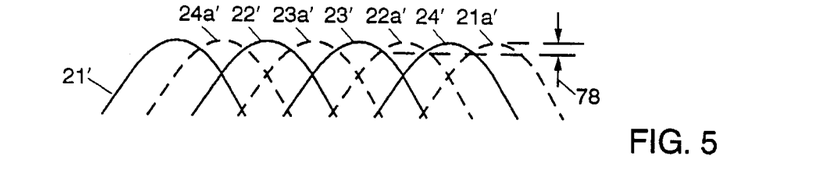
FIG. 5 is an antenna pattern representation showing four additional beams superimposed on the beams shown in FIG. 4 with angular diversity.

In accordance with the invention, the loss of gain at the crossover between adjacent narrow beams can be partially overcome by use of a second set of beams which are aligned to provide angular diversity by being angularly shifted in azimuth relative to the first set of beams. This is illustrated in FIG. 5, which shows the beams 24a'–21a' superimposed upon the beams 21'–24' in shifted angular relationship. More particularly, the beam center lines of beams 24a'–22a' are each positioned in alignment with a region of beam crossover between beams 21'–24'. With this alignment between the beams 24a'–21a' of the second antenna assembly 20a, relative to the beams 21'–24' of the first antenna assembly 20, the gain differential between peak gain and gain at beam crossover is reduced to the gain differential indicated at 78 in FIG. 5. For the example discussed, the FIG. 5 gain differential 78 between beam peak and the crossover gain (e.g., at the crossover between beams 21' and 24a') is only 2 dB. Thus, at beam peak a 6 dB gain improvement will be provided, relative to the gain of a single wide beam sector antenna, and the gain improvement at beam crossover has been increased to 5 dB (as compared to the 2 dB figure described above for the FIG. 4 case). In application of the invention, processing of received signals (in order to combine signals from two adjacent beams, for example) can be carried out in different manners, without reducing minimum effective gain across the azimuth sector below the 5 dB gain improvement figure, although some techniques may reduce the 6 dB peak gain value.

Figures 6A, 6C, 6D:
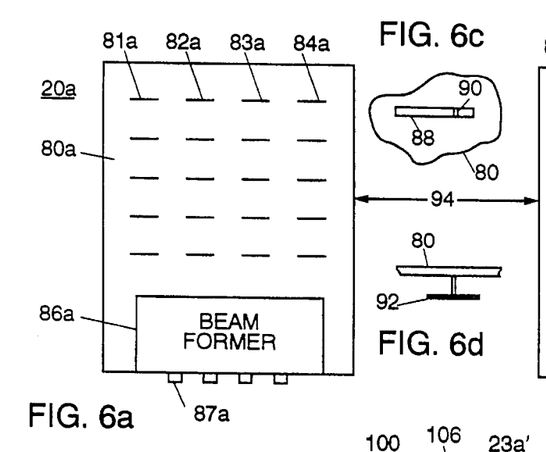
FIGS. 6a and 6b show forms of antenna assemblies 20 and 20a of FIG. 1 in greater detail.
FIGS. 6c and 6d respectively illustrate slot and dipole radiating elements usable in the antennas of FIGS. 6a and 6b.
Figure 6B:
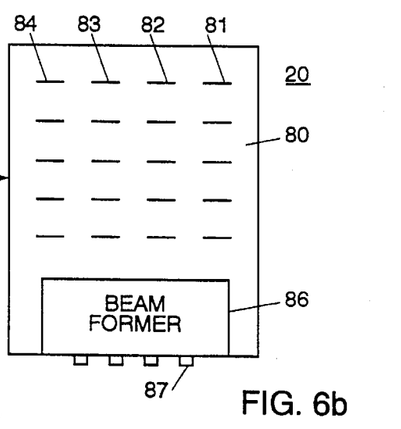

With the benefit of the foregoing description of angular diversity/spaced diversity operation in accordance with the invention, consideration will now be directed to an antenna system 10 utilizing the invention. In FIG. 6b there is shown at 20 an example of a first antenna assembly having a multi-beam antenna pattern providing coverage of an azimuth sector of interest (e.g., a 120 degree azimuth sector) via a plurality of beams. As illustrated in FIG. 4, each such beam 21'–24' has a peak gain value along its respective beam center line (e.g., centerline 70 of beam 21') and a crossover gain value in a region of beam crossover, e.g., in the vicinity of crossovers 74, 75, 76 between adjacent beams of 21'–24' of the first antenna assembly. As previously discussed, the difference in gain between such peak and crossover gain values is typically 4 dB, as represented at 72. As shown in FIG. 6b, antenna assembly 20 comprises four vertical arrays 81–84 of radiating elements in a spaced side-by-side configuration, and an associated conductive sheet 80 and beam forming network, shown as beam former 87. As illustrated in FIGS. 6c and 6d, respectively, each of the 20 radiating elements arranged in the vertical arrays 81–84 is typically either a slot 88, with transverse excitation coupler 90 extending behind conductive sheet 80, or a dipole 92. Slots, dipoles, patches, monopoles and other forms of radiating elements are well known to persons skilled in the art and may be utilized in antenna assemblies in accordance with the invention. Beam forming networks are also well known and beam former 86 can be arranged to provide first signals received in one of beams 21'–24' at one of the four ports of the beam former, such as port 87. Other antenna assembly components, such as intercoupling conductors not visible in FIG. 6b, are provided as appropriate in particular configurations.

In FIG. 6a there is shown at 20a an example of a second antenna assembly suitable for use in the angular diversity/ spaced diversity antenna system 10 in accordance with the invention. As shown, second antenna assembly 20a is laterally spaced from first antenna assembly 20 by a distance 94, which is equivalent to at least a plurality of wavelengths at an operating frequency. It will be understood that "an operating frequency" is a frequency within the frequency range in which antenna assemblies are designed to operate, and that a "plurality of wavelengths" encompasses a distance which may exceed a plurality of wavelengths by any desired fraction or portion of a wavelength. The second antenna assembly 20a is similar to the first antenna assembly 20, having a peak gain value and a crossover gain value as described with respect to assembly 20, but need not be identical in all embodiments. As shown, corresponding components bear the suffix "a" in FIG. 6a. For purposes of the present discussion, first and second antenna assemblies 20 and 20a are assumed to be identical on a mirror image basis.

Figure 7:
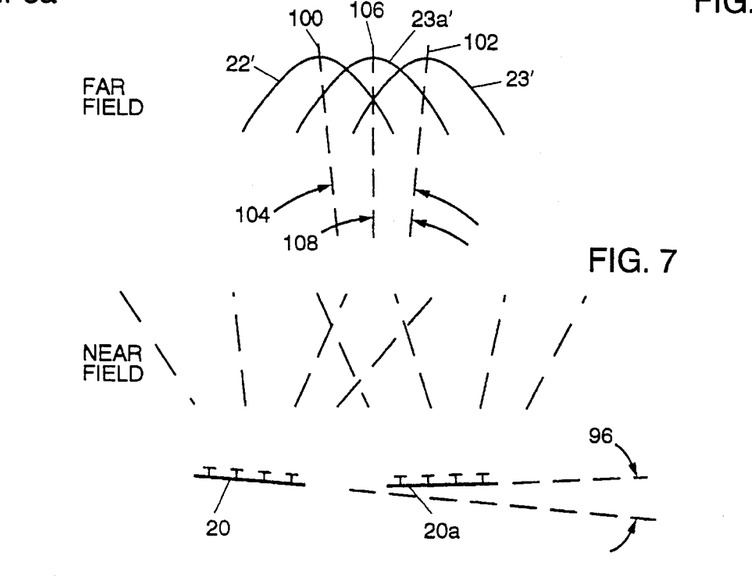
FIG. 7 illustrates alignment of antenna assemblies 20 and 20a of FIGS. 6a and 6b to provide angular diversity and a portion of the resulting far field antenna pattern.

FIGS. 6a and 6b taken together can be considered to be a front view of antenna assemblies 20 and 20a of FIG. 1. Referring now to FIG. 7, there is shown a simplified top view of antenna assemblies 20 and 20a of FIGS. 6a and 6b in an embodiment in which arrays 81–84 and 81a–84a each comprise a plurality of dipoles vertically aligned (e.g., five dipoles as shown). In FIG. 7, second antenna assembly 20a is aligned at a different azimuth within the sector of interest, relative to first antenna assembly 20. More specifically, as shown, there is an azimuth differential 96 which is nominally 15 degrees in the present example. The upper part of FIG. 7 is a partial representation of the composite far field antenna pattern produced by antenna assemblies 20 and 20a aligned as shown in the lower portion of FIG. 7. As shown, beams 22' and 23' of first antenna assembly 20 have beam center lines 100 and 102 separated by an angle 104, which is nominally 30 degrees in this example. Beam 23a' of second antenna assembly 20a has a beam center line 106 separated from beam center line 102 (of beam 23') by an angle 108, which is nominally 15 degrees, corresponding to alignment angle 96. Thus, on an overall basis, the respective beams of the first and second antenna assemblies are in the relationship shown in FIG. 5, with each beam (shown dotted) of the second antenna assembly 20a partially overlapping at least one beam (shown by solid lines) of the first antenna assembly 20. As a result the peak to crossover gain value differential 72 represented in FIG. 4 (e.g., nominally 4 dB in this example) is reduced to the corresponding peak to crossover gain value differential 78 represented in FIG. 5 (e.g., nominally 1 dB in this example) as described more fully above. As used herein, "nominal" and "nominally" are used to indicate that a value is generally within plus or minus 20 percent of a stated value or level. Consistent with this, description of alignment of a beam center line of one beam of a first antenna assembly with a region of beam crossover between two beams of a second antenna assembly uses "region" to indicate nominal alignment with a crossover point between beams.

The angular diversity/spaced diversity antenna system 10 further includes first output port 37 and second output port 39a, as shown in FIG. 1. As previously described, port 37 is arranged to provide first signals received from a user, located in the sector, via one of the beams of the first antenna assembly 20, such beam typically being selected as the beam providing the largest amplitude user signals. Correspondingly, port 39a is arranged to provide second signals received from the same user via one of the beams of the second antenna assembly 20a. Such beam of the second antenna assembly typically provides coverage partially overlapping coverage provided by the beam of the first antenna assembly providing the first signals to port 37, but this may not pertain under certain conditions of signal transmission. The antenna system 10 is thus arranged to enable a receiver system 18 (having access to signals provided at the first and second ports 37 and 39a) to process one of the following: the first signals from first port 37, the second signals from second port 39a, a combination of the first and second signals. This provides spaced diversity and angle diversity reception of signals from the user with a resulting gain value higher than the crossover gain value regardless of the azimuth at which signals are received from the user located in the sector.

In view of the preceding description of an angle diversity/spaced diversity antenna system, a method for providing both higher antenna gain in an azimuth sector and spaced diversity reception in a communication system including a receiver system for receiving user signals from a user located in the sector includes the following steps:

(a) providing a first antenna assembly having a multi-beam antenna pattern providing coverage in the sector and including a plurality of beams each having a peak gain value along its respective beam center line and a crossover gain value in a region of beam crossover between adjacent beams of the first antenna assembly;

(b) aligning the antenna pattern of the first antenna assembly at a first azimuth within the sector;

(c) providing a second antenna assembly, laterally spaced from the first antenna assembly by a plurality of wavelengths at an operating frequency, having a multi-beam antenna pattern providing coverage in the sector and including a plurality of beams each having a peak gain value along its respective beam center line and a crossover gain value in a region of beam crossover between adjacent beams of the second antenna assembly;

(d) aligning the antenna pattern of the second antenna assembly at a different azimuth within the sector relative to the first azimuth of the first antenna assembly to position at least one of the beam center lines of the second antenna assembly in alignment with a region of beam crossover of the first antenna assembly so that each beam of the second antenna assembly provides coverage partially overlapping coverage provided by at least one beam of the first antenna assembly;

(e) providing first signals received from the user in one of the beams of the first antenna assembly;

(f) providing second signals received from the user in a beam of the second antenna assembly partially overlapping the aforesaid one of the beams of the first antenna assembly, or a different one of the beams of the first antenna assembly, (depending at least partially on environmental signal transmission conditions); and (g) processing in the receiver system one of the following, the first signals, the second signals, a combination of the first and second signals, to provide spaced diversity reception of signals and a gain value higher than the crossover gain values regardless of the azimuth at which signals are received from the user.

While there have been described the currently preferred embodiments of the invention, those skilled in the art will recognize that other and further modifications may be made without departing from the invention and it is intended to claim all modifications and variations as fall within the scope of the invention.

What is claimed is:

1. An angular diversity/spaced diversity method, for providing both higher antenna gain in an azimuth sector and spaced diversity reception in a communication system including a receiver system for receiving user signals from a user located in said sector, comprising the steps of:

(a) providing a first antenna assembly having a multi-beam antenna pattern providing coverage in said sector and including a plurality of beams each having a peak gain value along its respective beam center line and a crossover gain value in a region of beam crossover between adjacent ones of the beams of said first antenna assembly;

(b) aligning the antenna pattern of said first antenna assembly at a first azimuth within said sector;

(c) providing a second antenna assembly laterally spaced from said first antenna assembly by a plurality of wavelengths at an operating frequency, having a multi-beam antenna pattern providing coverage in said sector, and including a plurality of beams each having a peak gain value along its respective beam center line and a crossover gain value in a region of beam crossover between adjacent ones of the beams of said second antenna assembly;

(d) aligning the antenna pattern of said second antenna assembly at a different azimuth within said sector relative to said first azimuth to position at least one of the beam center lines of said second antenna assembly in alignment with a region of beam crossover of said first antenna assembly so that each beam of said second antenna assembly provides coverage partially overlapping coverage provided by at least one beam of said first antenna assembly;

(e) providing first signals received from said user in one of the beams of said first antenna assembly;

(f) providing second signals received from said user in a beam of said second antenna assembly providing coverage partially overlapping coverage provided by one of said beams of said first antenna assembly; and (g) processing in said receiver system one of the following, said first signals, said second signals, and a combination of said first and second signals, to provide spaced diversity reception of signals from said user with a resulting gain value higher than either of said crossover gain values regardless of the azimuth at which signals are received from said user located in said sector.

2. A method as in claim 1, wherein said step (d) aligning comprises aligning the antenna pattern of said second antenna assembly at an azimuth which differs from said first azimuth by an angle nominally equal to one-half the beam width of a beam of said first antenna assembly.

3. A method as in claim 1, wherein steps (a) and (c) each include providing an antenna assembly with a nominally 120 degree wide antenna pattern consisting of four beams each of nominally 30 degree beam width and said step (d) aligning comprises aligning the respective antenna patterns to position the beam center line of a beam of said second antenna assembly at a 15 degree azimuth angle relative to the beam center line of a beam of said first antenna assembly.

4. An angular diversity/spaced diversity antenna system, suitable for use in a communication system including a receiver system for receiving user signals from a user located in an azimuth sector, comprising:

a first antenna assembly having a multi-beam antenna pattern providing coverage in said sector via a plurality of beams each having a peak gain value along its respective beam center line and a crossover gain value in a region of beam crossover between adjacent ones of the beams of said first antenna assembly;

a second antenna assembly similar to said first antenna assembly, laterally spaced from said first antenna assembly by a plurality of wavelengths at an operating frequency and providing coverage in said sector via a plurality of beams each having a peak gain value and a crossover gain value as described for said first antenna assembly, said second antenna assembly aligned at a different azimuth within said sector relative to said first antenna assembly to position at least one of the beams of said second antenna assembly in alignment with a region of beam crossover of said first antenna assembly so that each beam of said second antenna assembly provides coverage partially overlapping coverage provided by at least one beam of said first antenna assembly;

a first output port, coupled to said first antenna assembly, providing first signals received from said user in one of the beams of said first antenna assembly; and a second output port, coupled to said second antenna assembly, providing second signals received from said user in a beam of said second antenna assembly;

the antenna system arranged to enable a receiver system having access to signals provided at said first and second output ports to process one of the following, said first signals, said second signals, and a combination of said first and second signals, to provide spaced diversity and angle diversity reception of signals from said user with a resulting gain value higher than said crossover gain value regardless of the azimuth angle at which signals are received from said user located in said sector.

5. An antenna system as in claim 4, wherein each of said first and second antenna assemblies is configured to provide four beams each of nominally 30 degrees beamwidth with an azimuth differential between adjacent beams of nominally 30 degrees, to provide coverage in a 120 degree azimuth sector, and wherein said different azimuth of alignment of said second antenna assembly relative to said first antenna assembly is nominally 15 degrees.

6. An antenna system as in claim 4, wherein each of said first and second antenna assemblies comprises four vertical arrays of dipoles in a side-by-side configuration and an associated beam forming network coupled to said arrays.

7. An antenna system as in claim 4, wherein each of said first and second antenna assemblies comprises four vertical arrays of slots in a side-by-side configuration and an associated beam forming network coupled to said arrays.

8. An antenna system as in claim 4, additionally including a receiver system coupled to said first and second output ports and arranged to process one of the following: said first signals, said second signals, and a combination of said first and second signals.

9. An antenna system as in claim 4, wherein said second antenna system is aligned so that predetermined beam center lines of said beams of said second antenna system are nominally aligned with respective ones of said regions of beam crossover of said first antenna assembly.

10. An antenna system as in claim 4, wherein each of said first and second antenna assemblies includes a beam forming network.

11. An antenna system as in claim 4, wherein said second signals are received in a beam of said second antenna assembly providing coverage partially overlapping coverage provided by the beam of said first antenna assembly which provides said first signals.

* * * * *